(12) United States Patent
Tsai et al.

(10) Patent No.: US 9,727,147 B2
(45) Date of Patent: Aug. 8, 2017

(54) UNLOCKING METHOD AND ELECTRONIC DEVICE

(71) Applicant: Acer Incorporated, New Taipei (TW)

(72) Inventors: Hsiao-Lan Tsai, New Taipei (TW);
Ming-Ho Lin, New Taipei (TW);
Cheng-Hsiung Chiang, New Taipei (TW); Wei-Yin Su, New Taipei (TW)

(73) Assignee: Acer Incorporated, New Taipei (TW)

( * ) Notice: Subject to any disclaimer, the term of this patent is extended or adjusted under 35 U.S.C. 154(b) by 327 days.

(21) Appl. No.: 14/506,686

(22) Filed: Oct. 5, 2014

(65) Prior Publication Data

US 2015/0177972 A1 Jun. 25, 2015

(30) Foreign Application Priority Data

Dec. 24, 2013 (TW) .............................. 102148004 A

(51) Int. Cl.
*G06F 3/0484* (2013.01)
*G06F 3/0346* (2013.01)
*G06F 3/0488* (2013.01)
*G06F 21/31* (2013.01)

(52) U.S. Cl.
CPC .......... *G06F 3/0346* (2013.01); *G06F 3/0484* (2013.01); *G06F 3/0488* (2013.01); *G06F 21/31* (2013.01)

(58) Field of Classification Search
CPC ............... G06F 3/0346; G06F 3/04847; G06F 3/04845; G06F 3/017; G06F 3/04842; G06F 3/041
See application file for complete search history.

(56) References Cited

U.S. PATENT DOCUMENTS

| | | | |
|---|---|---|---|
| 2010/0044121 A1* | 2/2010 | Simon | G06F 3/03547 178/18.03 |
| 2011/0059775 A1 | 3/2011 | Choi et al. | |
| 2012/0069231 A1 | 3/2012 | Chao | |
| 2012/0174042 A1* | 7/2012 | Chang | G06F 3/0488 715/863 |
| 2013/0227450 A1* | 8/2013 | Na | G06F 3/048 715/764 |
| 2013/0239045 A1 | 9/2013 | Lindberg et al. | |
| 2013/0326395 A1* | 12/2013 | Oh | G06F 3/041 715/781 |
| 2014/0109219 A1* | 4/2014 | Rohrweck | G06F 21/36 726/19 |

(Continued)

FOREIGN PATENT DOCUMENTS

| | | |
|---|---|---|
| CN | 101907968 | 12/2010 |
| CN | 102479038 | 5/2012 |

(Continued)

*Primary Examiner* — Anil Bhargava
(74) *Attorney, Agent, or Firm* — Jianq Chyun IP Office

(57) ABSTRACT

An unlocking method and an electronic device are provided. The method is suitable for the electronic device having a touch screen and being in a screen lock mode. The method includes: displaying a first region and a second region on the touch screen; adjusting the first region and the second region according to a tilting state of the electronic device; receiving a touch operation performed on the touch screen; and switching the electronic device to an unlock mode when the touch operation starts in the first region and ends in the second region.

22 Claims, 11 Drawing Sheets

(56) References Cited

U.S. PATENT DOCUMENTS

| | | | | |
|---|---|---|---|---|
| 2014/0181964 A1* | 6/2014 | Park | ................... | G06F 21/6209 |
| | | | | 726/19 |
| 2014/0337968 A1* | 11/2014 | Kim | ...................... | G06F 21/36 |
| | | | | 726/18 |
| 2015/0002423 A1* | 1/2015 | Chen | ...................... | G06F 3/041 |
| | | | | 345/173 |
| 2016/0124497 A1* | 5/2016 | Lee | ................... | G06K 9/00228 |
| | | | | 345/173 |

FOREIGN PATENT DOCUMENTS

| | | |
|---|---|---|
| CN | 102566881 | 7/2012 |
| TW | 201042530 | 12/2010 |
| TW | 201120867 | 6/2011 |
| TW | 201235934 | 9/2012 |

\* cited by examiner

UNLOCKING METHOD AND ELECTRONIC DEVICE

CROSS-REFERENCE TO RELATED APPLICATION

This application claims the priority benefit of Taiwan application serial no. 102148004, filed on Dec. 24, 2013. The entirety of the above-mentioned patent application is hereby incorporated by reference herein and made a part of this specification.

BACKGROUND OF THE INVENTION

Field of the Invention

The invention relates to an electronic device, and more particularly relates to an unlocking method and an electronic device using the unlocking method.

Description of Related Art

For a mobile device with a touch screen, after being idle for a period of time, the mobile device automatically turns off the screen display function of the touch screen. When the user turns on the screen again, the mobile device enters a screen lock mode. In the screen lock mode, most of the touch operations are deactivated to prevent the user from executing an undesired operation due to unintentional touch on the screen. In other words, in the screen lock mode, the mobile device only responds to a preset unlock operation.

Common unlock operations include slide to unlock, password input unlock, geometric connection unlock, fingerprint recognition unlock, and facial recognition unlock, for example. Password input unlock and geometric connection unlock are more complicated unlock procedures. Fingerprint recognition unlock and facial recognition unlock may not be always successful due to erroneous recognition. Therefore, slide to unlock, which is relatively simple and convenient, is still the most commonly used unlocking method. However, the position of the unlock object displayed on the screen is fixed. For a user who has smaller hands or uses mobile devices with larger screens, it may not be easy to complete the unlock operation with one hand.

SUMMARY OF THE INVENTION

The invention provides an unlocking method and an electronic device for instantly adjusting a region distribution, configured for unlocking, according to a tilting state of the electronic device, so as to improve the convenience and accuracy in unlocking the electronic device.

An exemplary embodiment of the invention provides an unlocking method, which is adapted for an electronic device provided with a touch screen and being in a screen lock mode. The unlocking method includes: displaying a first region and a second region on the touch screen; adjusting an area and/or a position of the first region and/or the second region according to a tilting state of the electronic device; receiving a touch operation performed on the touch screen; and switching the electronic device to an unlock mode when the touch operation starts in the first region and ends in the second region.

An exemplary embodiment of the invention provides an unlocking method, which is adapted for an electronic device provided with a touch screen and being in a screen lock mode. The unlocking method includes: displaying a first region and a second region on the touch screen; adjusting an area and/or a position of the first region and/or the second region according to using state information of the electronic device or external environment information; receiving a touch operation performed on the touch screen; and switching the electronic device to an unlock mode when the touch operation starts in the first region and ends in the second region.

An exemplary embodiment of the invention provides an electronic device, which includes a touch screen, a G-sensor, and a processor. The touch screen is configured to receive a touch operation performed on the touch screen. The G-sensor is configured to sense a tilting state of the electronic device. The processor is coupled to the touch screen and the G-sensor. When the electronic device is in a screen lock mode, the processor is configured to display a first region and a second region on the touch screen and adjust an area and/or a position of the first region and/or the second region according to the tilting state of the electronic device. When the touch operation starts in the first region and ends in the second region, the processor further switches the electronic device to an unlock mode.

An exemplary embodiment of the invention provides an electronic device, which includes a touch screen, an external environment sensor, and a processor. The touch screen is configured to receive a touch operation performed on the touch screen. The external environment sensor is configured to sense external environment information. The processor is coupled to the touch screen and the external environment sensor. When the electronic device is in a screen lock mode, the processor is configured to display a first region and a second region on the touch screen and adjust an area and/or a position of the first region and/or the second region according to using state information of the electronic device or the external environment information. When the touch operation starts in the first region and ends in the second region, the processor further switches the electronic device to an unlock mode.

Based on the above, when the electronic device is in the screen lock mode, the area and/or the position of a first region and/or a second region displayed on the touch screen is adjusted in accordance with the tilting state of the electronic device and/or other information. When the processor detects that the touch operation performed by the user on the touch screen starts in the first region and ends in the second region, the processor unlocks the electronic device.

To make the aforementioned and other features and advantages of the invention more comprehensible, several exemplary embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Figure 1:
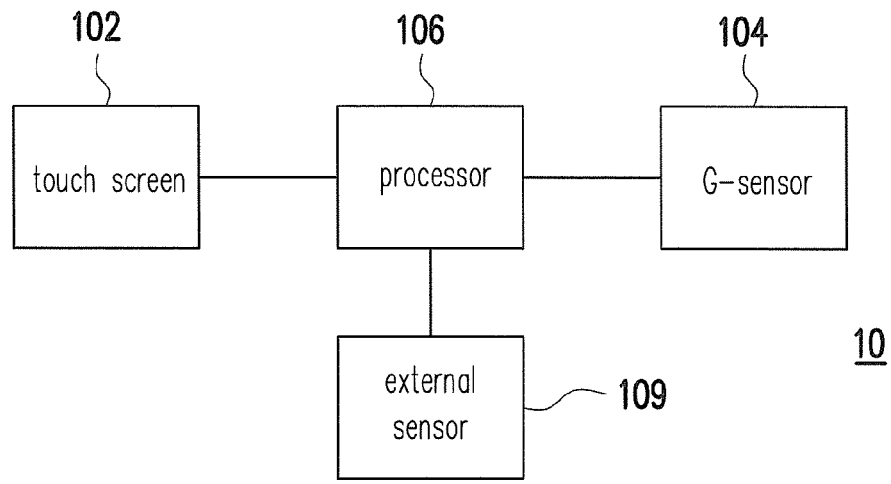
FIG. 1 is a schematic diagram illustrating an electronic device according to an exemplary embodiment of the invention.

FIG. 1 is a schematic diagram illustrating an electronic device according to an exemplary embodiment of the invention.

Referring to FIG. 1, an electronic device 10 may be a portable electronic device, such as mobile phone, personal digital assistant (PDA), smart phone, electronic book, video game console, or tablet computer, etc. The electronic device 10 may also be a screen component of a detachable laptop computer or a detachable desktop computer.

The electronic device 10 includes a touch screen 102, a G-sensor 104, and a processor 106.

The touch screen 102 serves as an interface for inputting an operation command and displaying an output message. For example, the user may use an input tool, such as stylus or finger, to perform a touch operation, such as clicking or sliding, on the touch screen 102, so as to input text or a command. The touch screen 102 may include a resistive touch panel, a capacitive touch panel, an optical touch panel, an acoustic wave touch panel, and an electromagnetic touch panel. However, the invention is not limited to the foregoing. Moreover, the touch screen 102 may further include a touch screen controller (not shown). The touch screen controller is configured to control the display of the touch screen 102 according to the command of the processor 106, receive a touch signal detected by the touch screen 102, and convert the touch signal to a position message to be transmitted to the processor 106.

The touch screen 102 has an OFF state and an ON state. For example, if the electronic device 10 lies idle for a predetermined period of time (e.g. 10 seconds), the touch screen 102 may be automatically switched to the OFF state. Moreover, the user may switch the touch screen 102 to the OFF state by performing a special gesture or pressing a physical button on the electronic device 10. When the touch screen 102 is in the OFF state, the touch screen 102 does not display any image, and a touch detection function of the touch screen 102 may be selectively maintained or turned off. The user may switch the touch screen 102 from the OFF state to the ON state by performing a special gesture or pressing the physical button on the electronic device 10. When the touch screen 102 is in the ON state, the touch screen 102 displays an image normally and executes the touch detection function.

The G-sensor 104 is configured to sense a tilting state of the electronic device 10. In this exemplary embodiment, the tilting state of the electronic device 10 is indicated by a tilting angle. For example, the G-sensor 104 senses an angle between an axial direction of the electronic device 10 and a horizontal plane or a complementary angle of the aforementioned angle. The electronic device 10 transmits the sensed angle to the processor 106. In another exemplary embodiment, the G-sensor 104 may be implemented with a somatosensory circuit, such as linear accelerometer, to improve the sensing accuracy and diversity.

The processor 106 is coupled to the touch screen 102 and the G-sensor 104. The processor 106 is mainly configured for data processing of the electronic device 10. The processor 106 may include a central processing unit (CPU), an embedded controller, and a micro-controller. Nevertheless, it is noted that the invention is not limited thereto.

In addition, the electronic device 10 may further include a communication device (not shown), an image capturing device (not shown), a storage device (not shown), a power supply device (not shown), an audio output device (not shown), and a signal input device (not shown). Nevertheless, the invention is not limited to the foregoing. The communication device is configured to perform wireless communication, such as access to the Internet and/or communicate by the telephone. The image capturing device is configured to execute an image capturing process so as to obtain and record an image. For example, the image capturing device may include a front camera 108 (shown in FIG. 2), a rear camera, and an image capturing module having a photosensitive element. The storage device is configured to store data for access of the processor 106. For example, the storage device may include at least one of a hard disk drive (HDD), a volatile memory, and a non-volatile memory. However, it is noted that the invention is not limited thereto. The power supply device is configured to supply power that the electronic device 10 requires for operation. For example, the power supply device may include a battery. The audio output device is configured to output an audio signal. For example, the audio output device may include a loudspeaker. The signal input device is configured to receive an input signal. For example, the signal input device may include the physical button disposed on the electronic device 10, an audio input device such as a microphone, and various external signal input devices. In addition, in an exemplary embodiment, the signal input device may also include a mouse, a keyboard, and a touch pad, etc. Nevertheless, it is noted that the invention is not limited to the above.

The electronic device 10 is adapted to switch between a screen lock mode and an unlock mode. In the unlock mode, the electronic device 10 is normally operable, for example, to detect all touch operations the user performs on the touch screen 102 for the processor 106 to generate a corresponding operation command. When the touch screen 102 is switched from the OFF state to the ON state, the electronic device 10 remains in the screen lock mode or automatically enters the screen lock mode. Moreover, the user may press a specific button or execute a specific application program to cause the electronic device 10 to enter the screen lock mode. Nevertheless, it is noted that the invention is not limited to the above. In the screen lock mode, the touch screen 102 displays a screen lock image, and most of the touch functions are limited.

In an exemplary embodiment, when the electronic device 10 is in the screen lock mode and the touch screen 102 is in the ON state, the processor 106 controls the touch screen 102 to display the screen lock image and displays a first region and a second region on the touch screen 102. For example, the first region may be a part of the screen lock image, and the second region may be the other part of the screen lock image. The first region and the second region may cover the entire screen lock image or parts of the screen lock image.

The processor 106 adjusts the first region and/or the second region according to the tilting state of the electronic device 10. For example, the processor 106 obtains a tilting angle (e.g. an angle value from the G-sensor 104) of the electronic device 10 according to a sensing result of the G-sensor 104. In another exemplary embodiment, the electronic device 10 may detect a human face through the front camera 108 and obtain the tilting angle of the electronic device 10 based on a tilting state of the human face. Then, the processor 106 adjusts the area and/or the position of the first region and/or the area and/or the position of the second region according to the tilting angle. The area and/or the position of the first region and the area and/or the position of the second region may be correlated or uncorrelated. For example, in an exemplary embodiment, when the area and/or the position of the first region is adjusted, the area and/or the position of the second region is adjusted correspondingly. In another exemplary embodiment, when the area and/or the position of the first region is adjusted, the area and/or the position of the second region is not adjusted correspondingly.

In an exemplary embodiment, the processor 106 divides the first region and the second region by using a dividing line, and the processor 106 adjusts a position and/or a tilting angle of the dividing line according to the aforementioned tilting angle. Through adjusting the position and/or the tilting angle of the dividing line, the effect of adjusting the area and/or the position of the first region and/or the area and/or the position of the second region can also be reached. The dividing line is a straight line or a curve line, which may be smooth or have a visual effect such as waves or spray, etc. the dividing line may be visible or non-visible. In an exemplary embodiment, the processor 106 may identify the two side regions of the dividing line by using different visual effects, such as different colors or luminances. In an exemplary embodiment, the operation for displaying the dividing line of the processor 106 may indicates that the processor 106 divides the touch screen 102 into two adjacent regions (e.g., the first region and the second region), and serves the border of the two regions as the dividing line.

Moreover, in another exemplary embodiment, the processor 106 may display a plurality of dividing lines on the touch screen 102. However, it is noted that the invention is not limited to the above. In an exemplary embodiment, each dividing line has two end points. For example, the two end points of each dividing line are respectively connected to two opposite or adjacent sides of the screen lock image. However, in another exemplary embodiment, one or both of the two end points of the dividing line may not be connected to the side of the screen lock image. Nevertheless, it is noted that the invention is not limited to the above.

Figure 2:
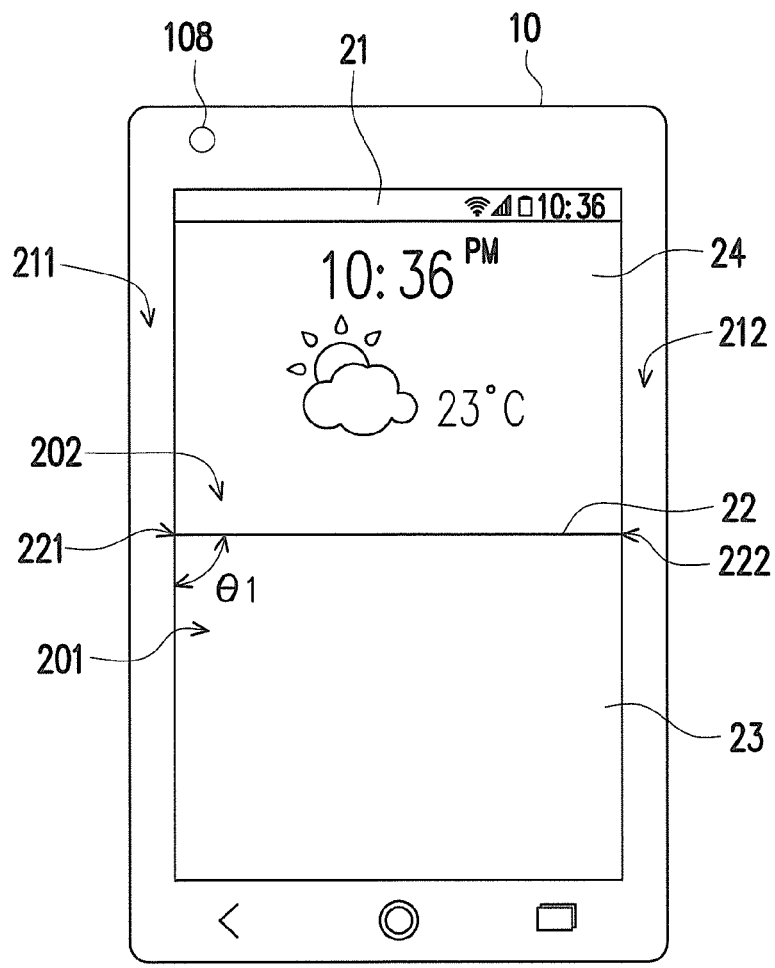
FIG. 2 is a schematic diagram of displaying a screen lock image according to an exemplary embodiment of the invention.

FIG. 2 is a schematic diagram of displaying a screen lock image according to an exemplary embodiment of the invention.

With reference to FIG. 2, when the electronic device 10 is in the screen lock mode and the touch screen 102 is in the ON state, a display image 21 displayed by the touch screen 102 is the screen lock image, and the touch screen 102 displays a dividing line 22 on the screen lock image, so as to divide the screen lock image into region 23 and region 24. Here, it is given that the size of the display image 21 is equal to the size of the touch screen 102. Accordingly, each side of the display image 21 respectively overlaps each side of the touch screen 102. In an exemplary embodiment, the first region is region 23, and the second region is region 24. in another exemplary embodiment, the first region is region 24, and the second region is region 23.

In an exemplary embodiment, the processor 106 obtains the tilting state of the electronic device 10 according to the sensing result of the G-sensor 104 or the front camera 108, and thus displays the dividing line 22 parallel to the horizontal plane. That is to say, as shown in FIG. 2, in an exemplary embodiment, when the processor 106 determines that the current axial direction of the electronic device 10 is perpendicular to the horizontal plane, the length of the dividing line 22 is substantially equal to the length of a short side of the display image 21, wherein an end point 221 of the dividing line 22 is connected to a side 211 of the display image 21 and an end point 222 of the dividing line 22 is connected to a side 212 of the display image 21, and an angle $\theta 1$ between the dividing line 22 and the side 211 of the display image 21 is about 90 degrees. In other words, in this exemplary embodiment, the angle $\theta 1$ is substantially equal to the angle between the axial direction of the electronic device 10 and the horizontal plane.

When the electronic device 10 is in the screen lock mode and the touch screen 102 is in the ON state, the processor 106 continuously determines whether the tilting state of the electronic device 10 changes. The aforementioned change may simply refer to a change of the tilting angle or a change of the tilting angle that exceeds a predetermined degree. If the tilting state of the electronic device 10 remains unchanged, the processor 106 does not adjust the dividing line. On the other hand, if the tilting state of the electronic device 10 changes, the processor 106 dynamically adjusts the dividing line.

Figure 3:
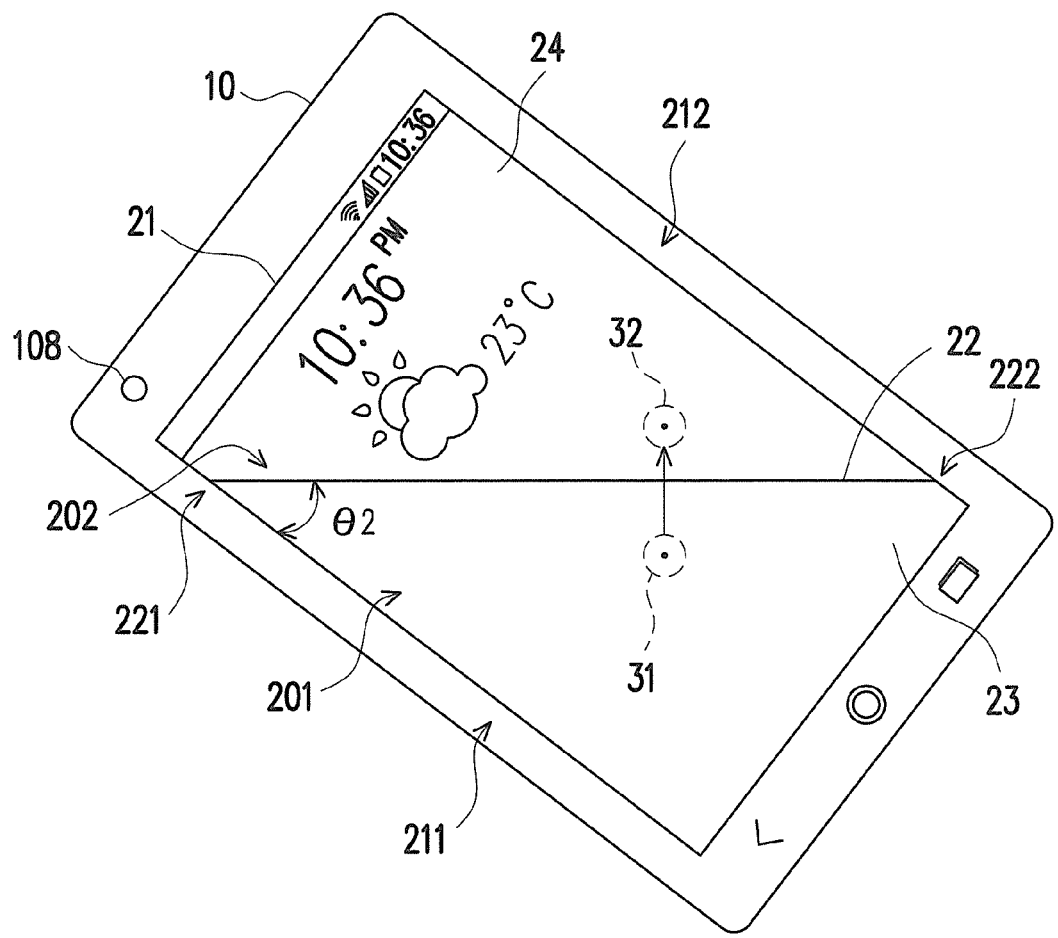
FIG. 3 is a schematic diagram of adjusting a screen lock image according to an exemplary embodiment of the invention.

FIG. 3 is a schematic diagram of displaying screen lock image according to an exemplary embodiment of the invention.

With reference to FIG. 3, a difference between this exemplary embodiment and the exemplary embodiment of FIG. 2 lies in that: in this exemplary embodiment, the user tilts the electronic device 10 to the left, such that the processor 106 determines that the axial direction of the electronic device 10 changes according to the sensing result of the G-sensor 104 or the front camera 108. At the same time, the processor 106 adjusts the dividing line 22 according to the tilting state of the electronic device 10. For example, the processor 106 adjusts the dividing line 22 to be parallel to the horizontal plane. As shown in FIG. 3, after the dividing line 22 is adjusted, an angle $\theta 2$ between the dividing line 22 and the side 211 of the display image 21 is smaller than 90 degrees, and the angle $\theta 2$ is substantially equal to the angle between the axial direction of the electronic device 10 and the horizontal plane.

It is worth mentioning that, as shown in FIG. 2 and FIG. 3, the region 23 is located at the side 201 of the dividing line 22 and the region 24 is located at the side 202 of the dividing line 22. Before the dividing line 22 is adjusted, the region 23 has a first area (or a first area size), as illustrated in the exemplary embodiment of FIG. 2, for example. After the dividing line 22 is adjusted, the region 23 has a second area (or a second area size), as illustrated in the exemplary embodiment of FIG. 3, for example. In this exemplary embodiment, the first area is equal to the second area, and the same applies to the region 24. That is, in this exemplary embodiment, no matter how the dividing line 22 is adjusted, the respective areas of the region 23 and the region 24 remain unchanged. However, in another exemplary embodiment, the processor 106 adjusts the position, the area and/or ratio of the region 23 and the region 24 in accordance with the adjustment of the dividing line 22.

When the user touches the touch screen 102 to perform the touch operation such as dragging or sliding, if the touch operation starts in the first region and ends in the second region, the processor 106 switches the electronic device 10 to the unlock mode.

Figure 4:
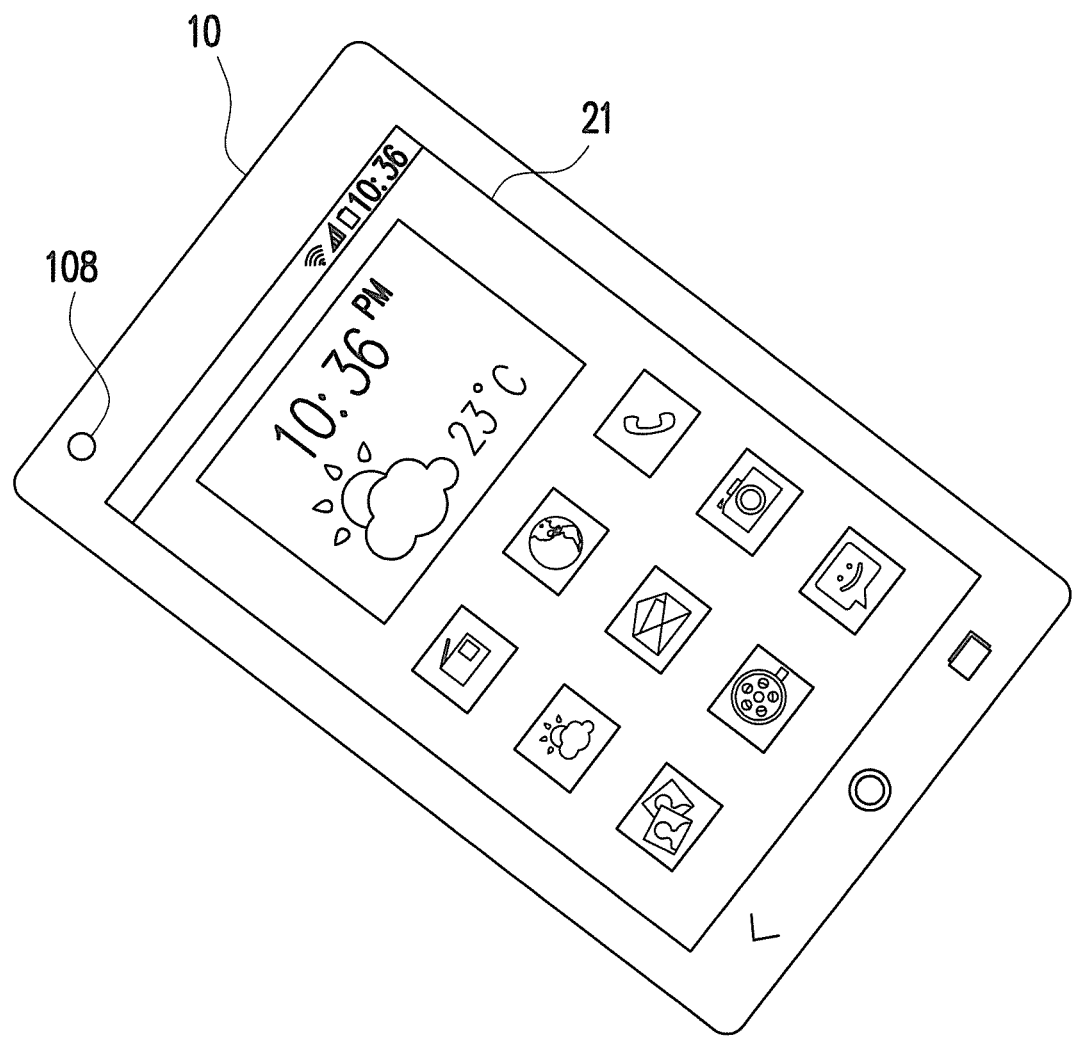
FIG. 4 is a schematic diagram of switching to an unlock mode according to an exemplary embodiment of the invention.

FIG. 4 is a schematic diagram of switching to an unlock mode according to an exemplary embodiment of the invention.

With reference to FIG. 3 and FIG. 4, when the user performs the continuous touch operation of touching a contact position 31 with a finger, sliding the finger from the contact position 31 to a contact position 32 and then moving the finger away from the touch screen 102, the processor 106 determines that the touch operation starts in the side 201 (or in the region 23) of the dividing line 22 and ends in the side 202 (or in the region 24) of the dividing line 22 through the touch screen 102. At the same time, the processor 106 switches the electronic device 10 to the unlock mode and controls the touch screen 102 to switch the display image 21 to a normal operation image. The normal operation image is a desktop, a front page, or an application program interface displayed by the touch screen 102 before the electronic device 10 enters the screen lock mode.

In this exemplary embodiment, the touch operation starts in the side 201 (or in the region 23) of the dividing line 22 and ends in the side 202 (or in the region 24) of the dividing line 22, so that the processor 106 switches the electronic device 10 to the unlock mode. That is to say, if the touch operation starts in the side 201 (or in the region 23) of the dividing line 22 but does not end at the side 202 (or in the region 24), the processor 106 does not switch the electronic device 10 to the unlock mode. Further, in another exemplary embodiment, if a touch operation starts in the side 202 (or in the region 24) of the dividing line 22 and then ends in the side 201 (or in the region 23) of the dividing line 22, the processor 106 also switches the electronic device 10 to the unlock mode. The aforementioned unlock operation also applies to the exemplary embodiment of FIG. 2. Thus, details thereof are not repeated hereinafter.

It is also noted that, in another exemplary embodiment, the processor 106 further determines whether the touch operation is performed across the dividing line 22. If the touch operation is performed across the dividing line 22 and meets the aforementioned rules, the processor 106 switches the electronic device 10 to the unlock mode. On the contrary, in the case that the touch operation is not performed across the dividing line 22, even if the touch operation starts in the first region and ends in the second region, the processor 106 does not switch the electronic device 10 to the unlock mode.

That is to say, in the above exemplary embodiment, the user may perform a slide operation across the dividing line at a blank position (position without any operable object) on the screen lock image to unlock the electronic device 10. However, in the following exemplary embodiment, the user is required to drag a specific object to unlock the electronic device 10. To make the disclosure easily comprehensible, the object that is displayed on the screen lock image for the user to drag on the screen lock image is collectively referred to as an operable object. For example, in an exemplary embodiment, the operable object is an unlock object that only has the unlock function.

Figure 5:
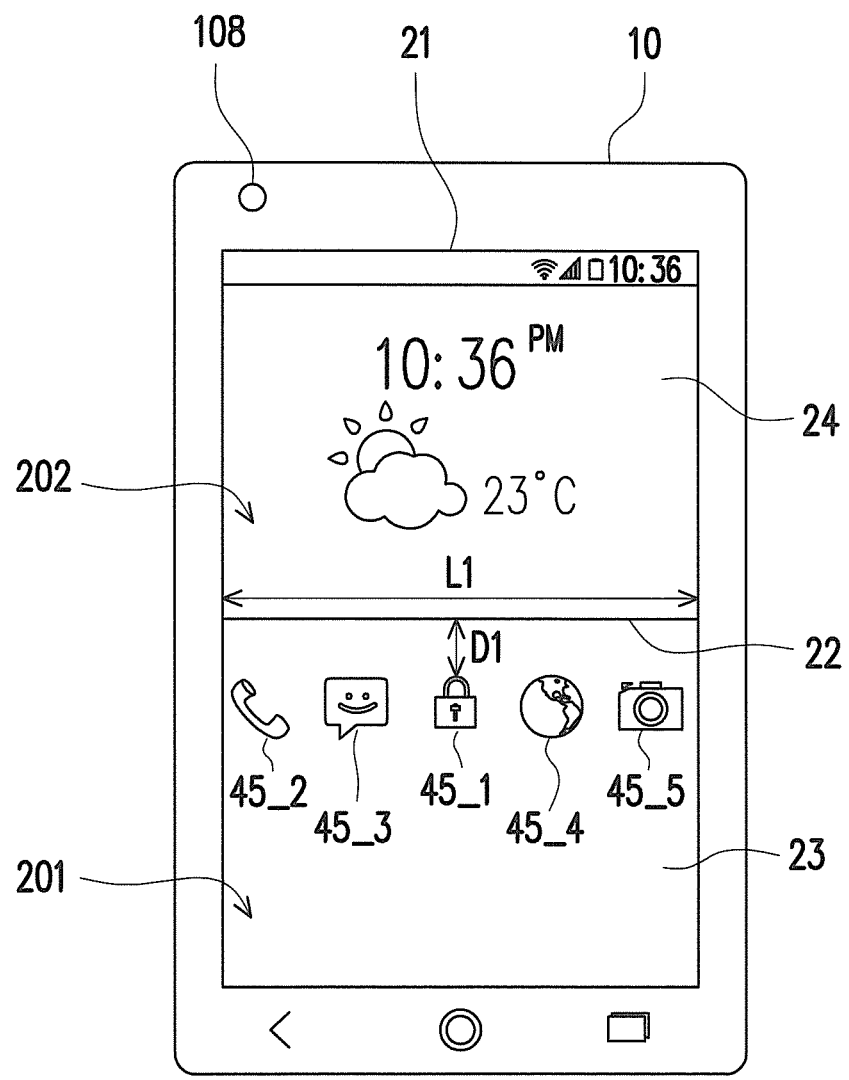
FIG. 5 is a schematic diagram of displaying a screen lock image according to an exemplary embodiment of the invention.

FIG. 5 is a schematic diagram of displaying a screen lock image according to an exemplary embodiment of the invention.

With reference to FIG. 5, a difference between this exemplary embodiment and the exemplary embodiment of FIG. 2 lies in that: in this exemplary embodiment, when the electronic device 10 is in the screen lock mode and the touch screen 102 is in the ON state, the touch screen 102 displays an unlock object 45_1 at the side 201 of the dividing line 22 (or region 23). As shown in FIG. 5, in this exemplary embodiment, a distance between the unlock object 45_1 and the dividing line 22 is D1 and the length of the dividing line 22 is L1.

Figure 6:
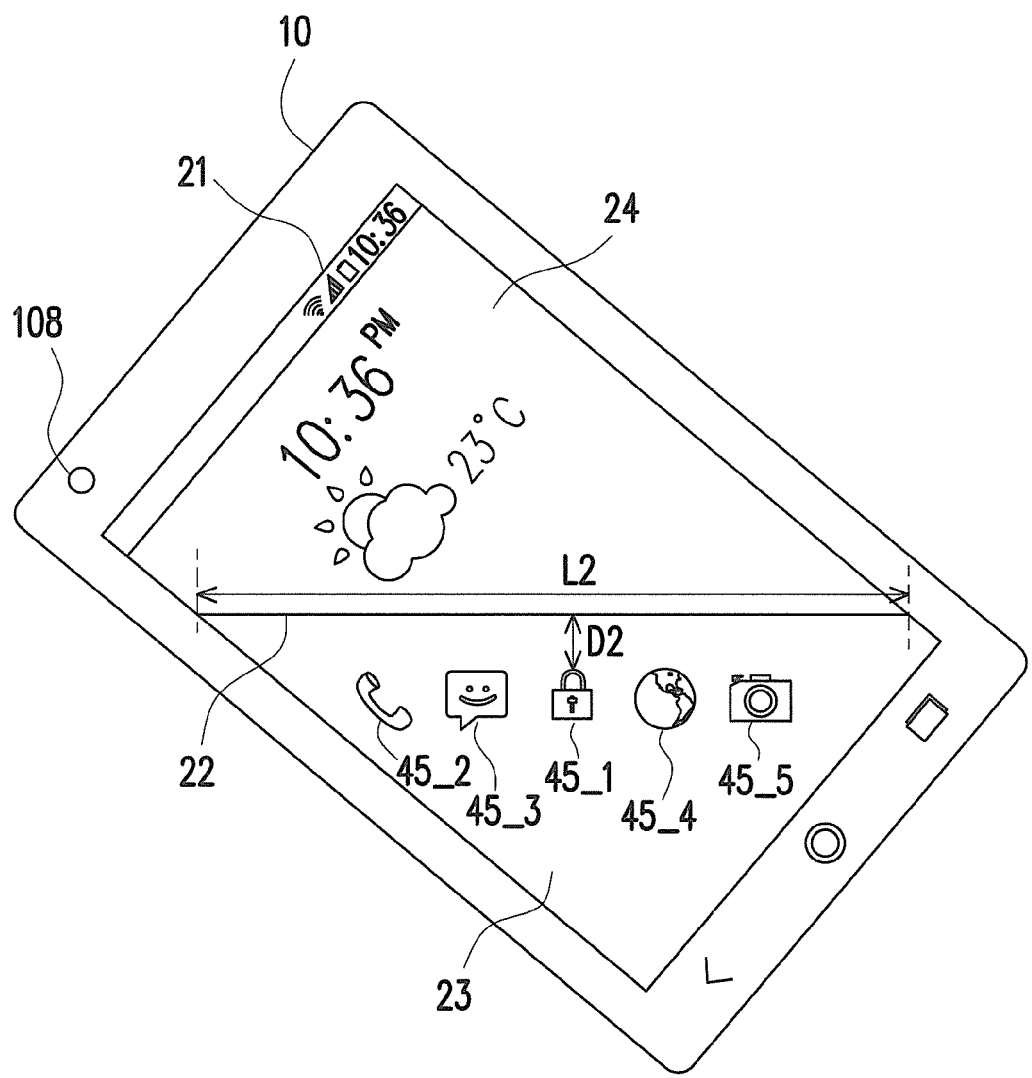
FIG. 6 is a schematic diagram of adjusting a screen lock image according to an exemplary embodiment of the invention.

FIG. 6 is a schematic diagram of adjusting a screen lock image according to an exemplary embodiment of the invention.

With reference to FIG. 6, when the user tilts the electronic device 10 to the left and causes the processor 106 to determine that the tilting state of the electronic device 10 changes according to the sensing result of the G-sensor 104 or the front camera 108, the processor 106 adjusts the dividing line 22 according to the tilting state of the electronic device 10. For example, the dividing line 22 is adjusted to be parallel to the horizontal plane. When the dividing line 22 is adjusted, the position of the unlock object 45_1 is adjusted correspondingly. After the dividing line 22 and the unlock object 45_1 are adjusted, as shown in FIG. 6, a distance between the unlock object 45_1 and the dividing line 22 is D2 and the length of the dividing line 22 is L2.

In this exemplary embodiment, the distance D1 and the distance D2 are substantially the same, and the length L2 is greater than the length L1. However, in an exemplary embodiment, the distance between the unlock object 45_1 and the dividing line 22 is in a negative correlation with the length of the dividing line 22. If the length of the dividing line 22 is increased, the distance between the unlock object 45_1 and the dividing line 22 is decreased. On the contrary, if the length of the dividing line 22 is decreased, the distance between the unlock object 45_1 and the dividing line 22 is increased. Thus, the distance D2 may be smaller than the distance D1. Moreover, in another exemplary embodiment, the distance between the unlock object 45_1 and the dividing line 22 is in a positive correlation with the length of the dividing line 22. Nevertheless, it is noted that the invention is not limited thereto.

When the touch screen 102 receives the touch operation, the processor 106 determines whether the touch operation received by the touch screen 102 is a drag operation corresponds to the unlock object 45_1. If the processor 106 determines that the touch operation is the drag operation corresponds to the unlock object 45_1, the processor 106 further determines whether the touch operation starts in the side 201 of the dividing line 22 (or region 23) and ends in the side 202 of the dividing line 22 (or region 24). If the touch operation starts in the side 201 of the dividing line 22 (or region 23) and ends in the side 202 of the dividing line 22 (or region 24), the processor 106 switches the electronic device 10 to the unlock mode.

Figure 7:
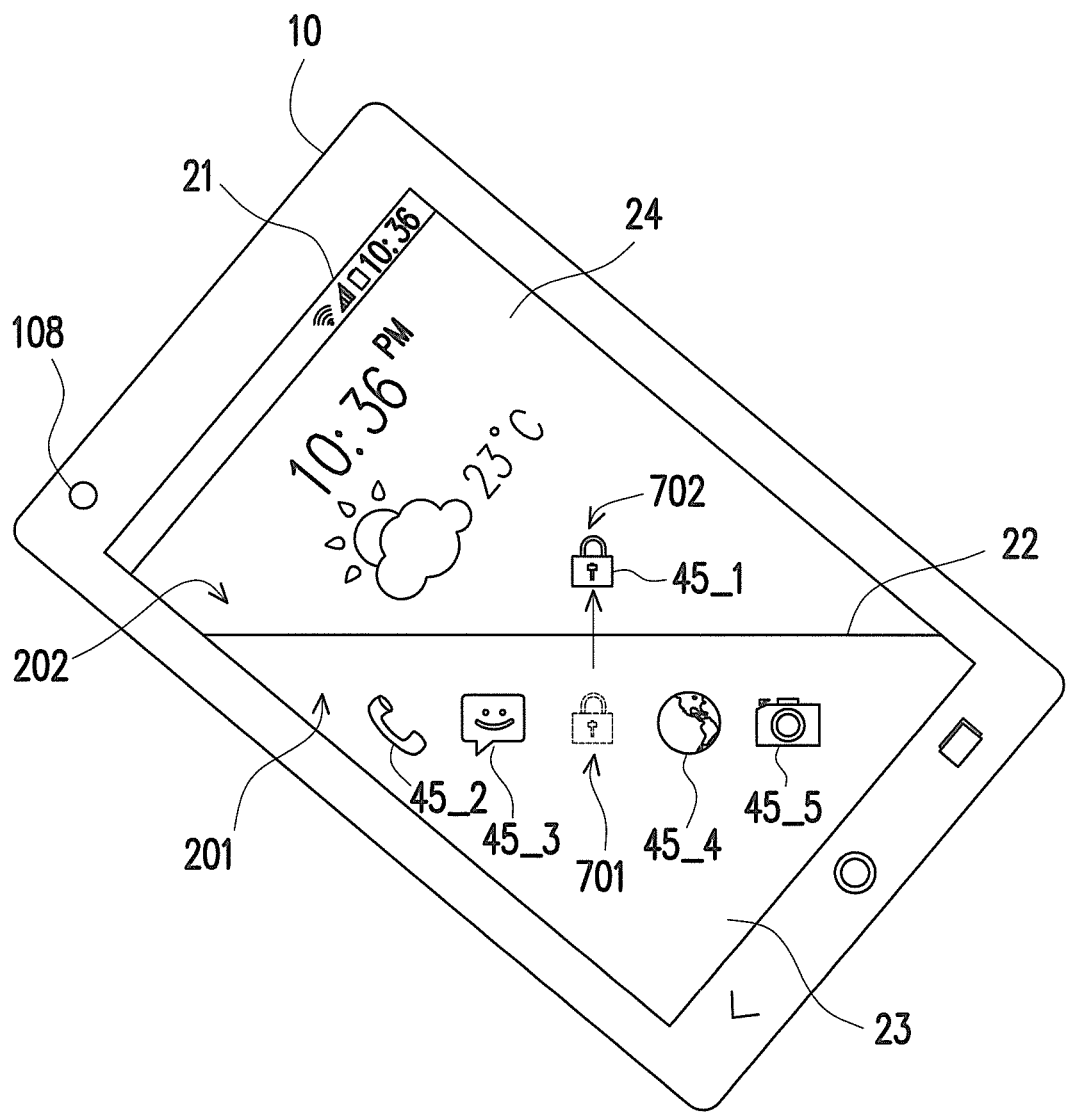
FIG. 7 is a schematic diagram of moving an operable object according to an exemplary embodiment of the invention.

FIG. 7 is a schematic diagram of moving the operable object according to an exemplary embodiment of the invention.

With reference to FIG. 7, after the user uses the finger to drag the unlock object 45_1 from a position 701 at the side 201 (or in the region 23) to a position 702 at the side 202 (or in the region 24), if the user moves the finger away from the touch screen 102 at position 702, the processor 106 switches the electronic device 10 to the unlock mode. For example, the processor 106 controls the touch screen 102 to display the display image 21 of FIG. 4. On the other hand, if the user does not move the finger away from any position at the side 202 (or in the region 24) but moves the unlock object 45_1 again to the side 201 (or in the region 23), the processor 106 does not switch the electronic device 10 to the unlock mode.

In an exemplary embodiment, the operable object also includes one or more application program object. Each application program object corresponds to an application program.

Referring to FIG. 5 to FIG. 7 again, in an exemplary embodiment, when the electronic device 10 is in the screen lock mode and the touch screen 102 is in the ON state, the touch screen 102 displays the unlock object 45_1 and application program objects 45_2-45_5 or displays only the application program objects 45_2-45_5 at the side 201 of the dividing line 22 (or region 23). Similar to the unlock object 45_1, after the dividing line 22 is adjusted, the distances between the application program objects 45_2-45_5 and the dividing line 22 substantially remain unchanged, or are in a negative or positive correlation with the length of the dividing line 22. Moreover, in an exemplary embodiment, the shape and/or the position of the region 23 changes with the tilting state of the electronic device 10, the application program objects 45_2-45_5 may be centralized or distributed in accordance with the shape and/or the position of the region 23.

Figure 8:
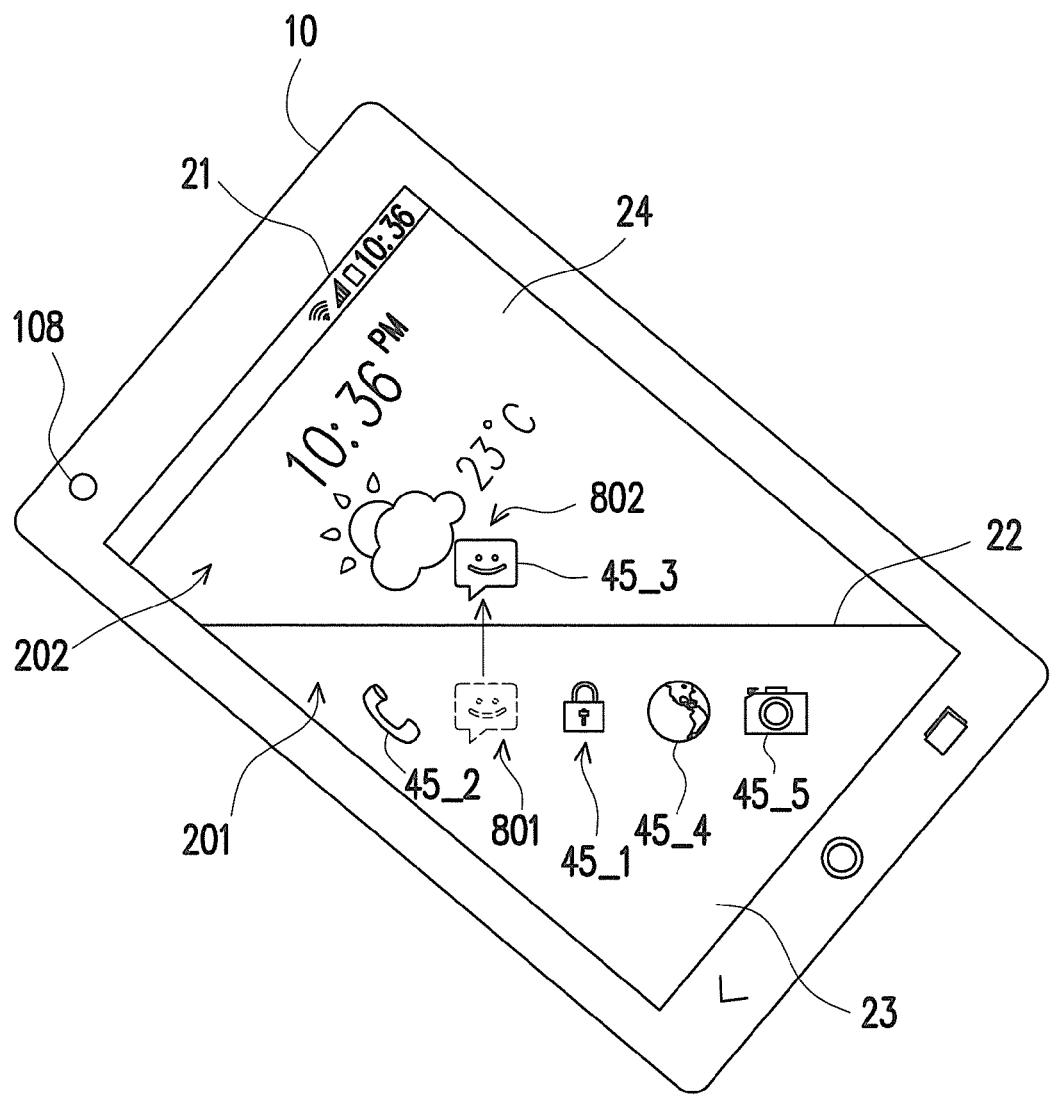
FIG. 8 is a schematic diagram of moving an operable object according to an exemplary embodiment of the invention.

FIG. 8 is a schematic diagram of moving an operable object according to an exemplary embodiment of the invention.

With reference to FIG. 8, take the application program object 45_3 as an example, after the user uses the finger to drag the application program object 45_3 from a position 801 at the side 201 (or in the region 23) to a position 802 at the side 202 (or in the region 24), if the user moves the finger away from the touch screen 102 at the position 802, the processor 106 switches the electronic device 10 to the unlock mode and controls the touch screen 102 to display the application program interface corresponding to the application program object 45_3.

Figure 9:
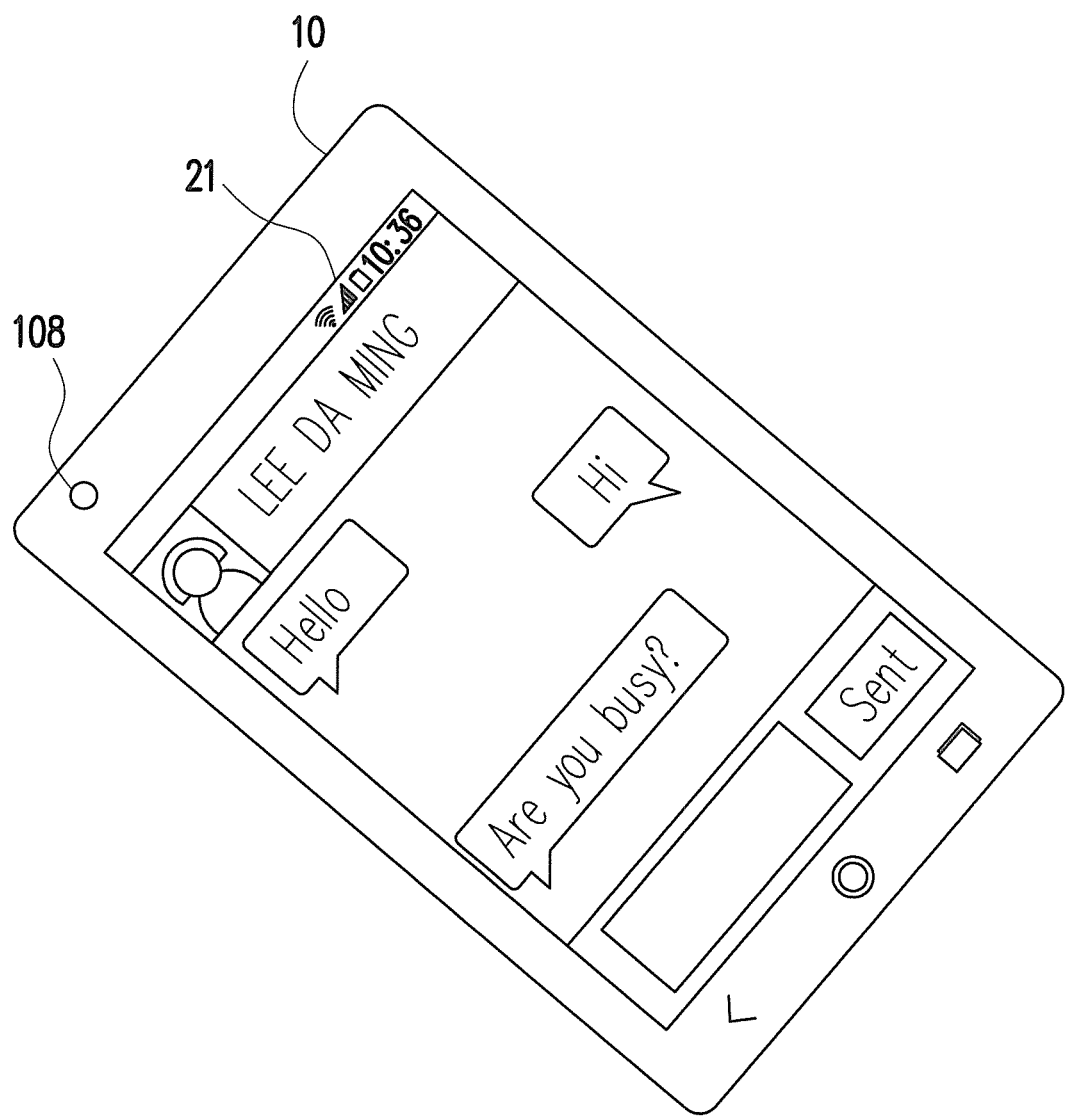
FIG. 9 is a schematic diagram of displaying an application program interface according to an exemplary embodiment of the invention.

FIG. 9 is a schematic diagram of displaying the application program interface according to an exemplary embodiment of the invention.

With reference to FIG. 8 and FIG. 9, it is given that the application program object 45_3 is an instant messaging object corresponds to an instant messaging application program. As or after the processor 106 switches the electronic device 10 to the unlock mode, the processor 106 displays the application program interface of the instant messaging application program on the display image 21 of the touch screen 102.

It is noted that, in the above exemplary embodiments, the dividing line 22 is maintained parallel to the horizontal plane. However, in other exemplary embodiments, the dividing line 22 may be maintained perpendicular to the horizontal plane or the angle between the dividing line 22 and the horizontal plane may be maintained at any angle. Furthermore, in an exemplary embodiment, the dividing line 22 may be in a geometric shape, such as circular or rectangular, wherein an inner region surrounded by the dividing line 22 may be deemed as the region 23 and an outer region outside the inner region surrounded by the dividing line 22 may be deemed as the region 24. Alternatively, the inner region surrounded by the dividing line 22 may be deemed as the region 24 while the outer region outside the inner region surrounded by the dividing line 22 may be deemed as the region 23. Then, according to the tilting state of the electronic device 10, the position and/or size of the region surrounded by the dividing line 22 on the display image of the touch screen 102 is adjusted dynamically. For example, when the user tilts the electronic device 10 to the left, the processor 106 moves the position of the dividing line 22 on the display image to one side of the display image. By contrast, when the user tilts the electronic device 10 to the right, the processor 106 moves the position of the dividing line 22 on the display image to another side of the display image. Moreover, in an exemplary embodiment, the first region and the second region may not be adjacent, and may be shaped independently. When the drag operation or slide operation of the user performed on the touch screen 102 starts in the first region and ends in the second region, the electronic device is unlocked.

In an exemplary embodiment, the processor 106 adjusts the first region and/or the second region according to the using state information of the electronic device 10 or external environment information. The using state information of the electronic device 10 may include power information (such as remaining power, etc.), effectiveness information (such as memory/storage space already be used, remaining memory/storage space or information of CPU resource, etc.), communication quality information (such as wireless network quality, signal strength, etc.), inside temperature information (such as temperature sensed by a temperature sensing element in the electronic device 10) or any system information of the electronic device 10 can be quantified. For example, when the power information indicates that the remaining power is increased, the area of the first region is increased, and the area of the second region is decreased; when the power information indicates that the remaining power is decreased, the area of the first region is decreased, and the area of the second region is increased. For example, when the effectiveness information indicates that the memory space already be used is increased, the position of the dividing line on the display image 21 is risen; when the effectiveness information indicates that the memory space already be used is decreased, the position of the dividing line on the display image 21 is declined, and so on. The external environment information may include local temperature information (such as local temperature or strength of Ultraviolet, etc.), local time information (such as morning, afternoon or exact time, etc.), body information of the user (such as heartbeat, blood pressure or body temperature, etc.), local air quality information (such as Air Pollution Index (API), etc.), external environment brightness information or any environment can be quantified. The external environment information may be downloaded form Internet or obtained by a sensor disposed on the electronic device 10.

For example, in an exemplary embodiment, the electronic device 10 further includes the external environment sensor 109. The external environment sensor 109 is coupled to the processor 106. The external environment sensor 109 may be a sensor such as a temperature sensor, a pressure sensor, a light sensor, and is for sensing external environment information such as temperature, brightness, humidity or body parameter and so on.

Figure 10:
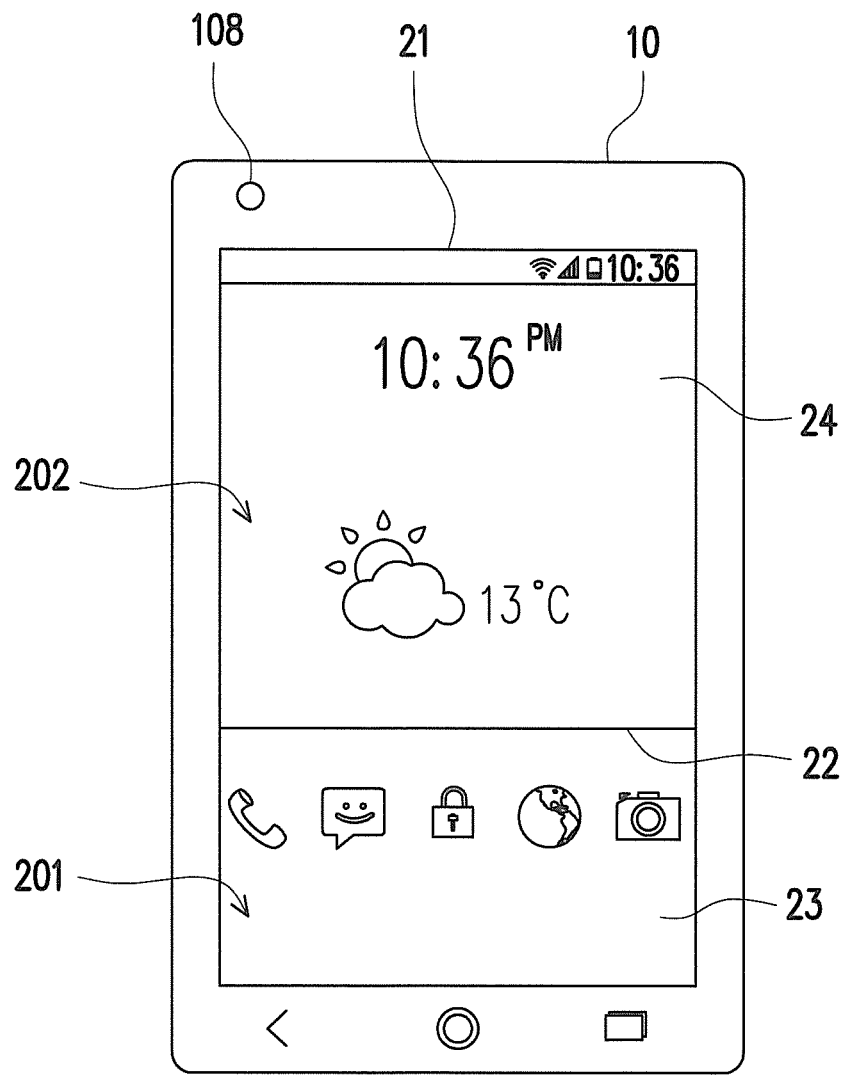
FIG. 10 and FIG. 11 are a schematic diagram of displaying a screen lock image according to an exemplary embodiment of the invention.
Figure 11:
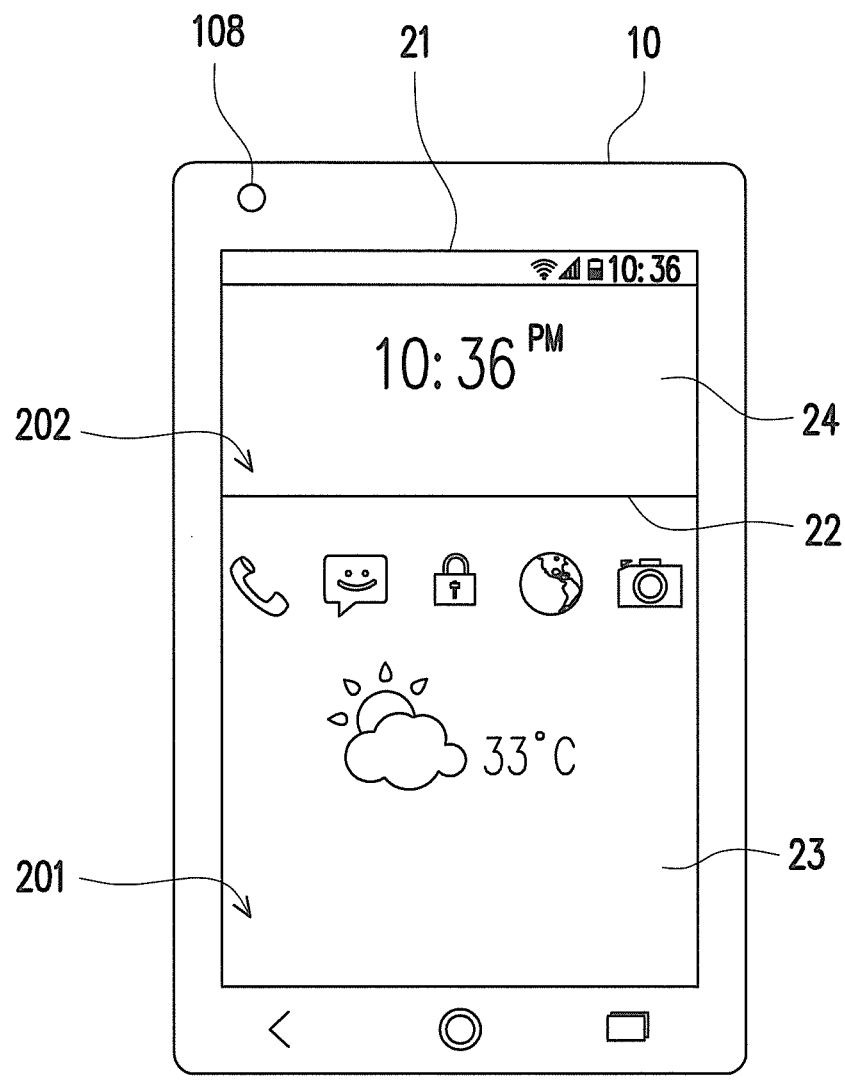

FIG. 10 and FIG. 11 are a schematic diagram of displaying a screen lock image according to an exemplary embodiment of the invention.

With reference to FIG. 10, it is assumed that local outside temperature is 13 Celsius, then the dividing line 22 may be declined to an appropriate position corresponding to the local outside temperature, so that the area of the region 23 may be decreased, and the area of the region 24 may be increased.

With reference to FIG. 11, it is assumed that local outside temperature is 30 Celsius, then the dividing line 22 may be risen to an appropriate position corresponding to the local outside temperature, so that the area of the region 23 may be increased, and the area of the region 24 may be decreased.

Moreover, in another exemplary embodiment, when the remaining power of the electronic device 10 is 40%, the area changes of the regions 23 and 24 may be presented as shown in FIG. 10; when the remaining power of the electronic device 10 is 80%, the area changes of the regions 23 and 24 may be presented as shown in FIG. 11. Other kind means for adjusting the area and/or the position of the first region and/or second region according to the using state information of the electronic device 10 or the external environment information may be analogized, and not be introduced repeatedly herein.

In an exemplary embodiment, the proportion of rise/decline of the dividing line (or the area proportion of the first region and the second region) may be determined according to a default adjusting rule, and/or the user may set a position range in which the dividing line can be moved. For example, depending on the palm size of the user, a position range in which the dividing line 22 can be moved. Then, the processor 106 may adjust the position of the dividing line 22 in the position range according to the using state information of the electronic device 10 or the external environment information. In addition, the parameters such as the shape, color, transparency of the dividing line, first region and/or second region may be adjusted according to the using state information of the electronic device 10 or the external environment information.

Accordingly, when the electronic device 10 is in the screen lock mode, the user may roughly know the using state of the electronic device 10 or the state of external environment according to the position, the area, and/or the shape of the first region and/or the second region, without performing completed operations such as unlocking and looking up operations. Moreover, the above exemplary embodiments may be combined or used solely. For example, in an exemplary embodiment, the processor 106 may adjust the area/position of the first region and the area/position of the second region according to the tilting state of the electronic device 10 and the using state information of the electronic device 10.

Figure 12:
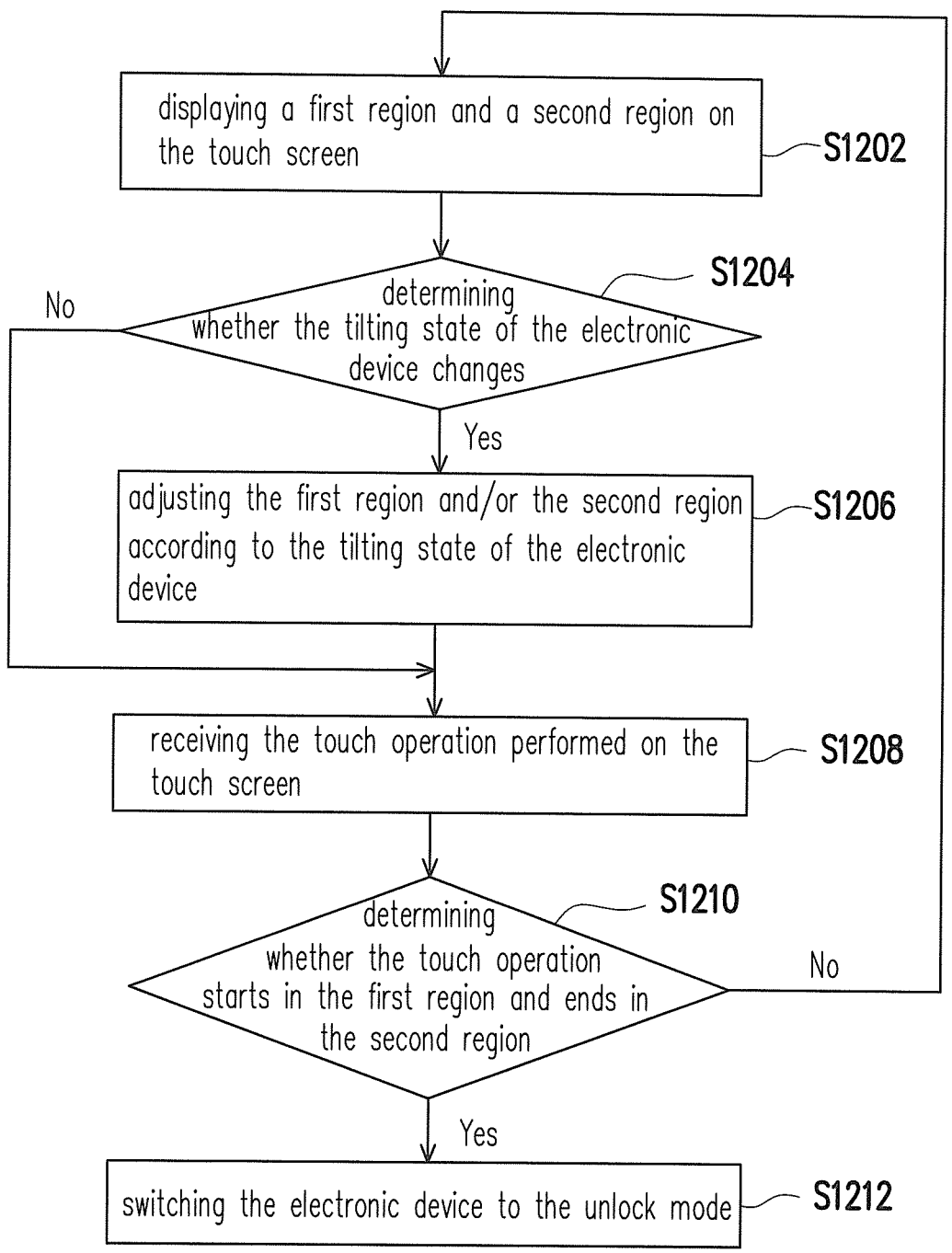
FIG. 12 is a flowchart illustrating an unlocking method according to an exemplary embodiment of the invention.

FIG. 12 is a flowchart illustrating an unlocking method according to an exemplary embodiment of the invention.

With reference to FIG. 12, in Step S1202, the processor 106 displays a first region and a second region on the touch screen 102.

In Step S1204, the processor 106 determines whether the tilting state of the electronic device 10 changes.

If the processor 106 determines that the tilting state of the electronic device 10 changes, in Step S1206, the processor 106 adjusts the area/poison of the first region and/or the area/poison of the second region according to the tilting state of the electronic device 10.

In Step S1208, the touch screen 102 receives the touch operation the user performs on the touch screen 102. Further, in Step S1204, if the processor 106 determines that the tilting state of the electronic device 10 does not change, Step S1208 is also executed after Step S1204.

In Step S1210, the processor 106 determines whether the received touch operation starts in the first region and ends in the second region.

When the processor 106 determines that the received touch operation starts in the first region and ends in the second region, in Step S1212, the processor 106 switches the electronic device 10 to the unlock mode. On the contrary, when the processor 106 determines that the received touch operation not starts in the first region and ends in the second region, Step S1202 is executed then, for example.

It is noted that the timing of executing Step S1208 is not necessarily after Step S1206, and Step S1208 may be executed at the same time as or before Step S1206. In addition, each step of FIG. 12 may be implemented as a plurality of program codes (such as program module) or electronic circuits, and the invention is not limited to the above. Further, the method of FIG. 12 may be used in combination with the above-described exemplary embodiments or be used solely. Nevertheless, the invention is not limited thereto.

To sum up, when the electronic device is in the screen lock mode, the dividing line, first region and/or second region displayed on the touch screen is adjusted dynamically in accordance with the tilting state of the electronic device and/or other information. When the processor detects that the touch operation performed by the user on the touch screen starts in first region and ends in second region, the processor unlocks the electronic device. Even if the user operates the electronic device with one hand, the user can adjust the dividing line to the easily operable position to unlock the electronic device with one hand. Moreover, in comparison with the conventional unlocking mechanism where unlock is performed by sliding on any position of the touch screen, for the invention, the user performs the slide or drag operation from one region to the other region and/or across the dividing line to unlock. Thus, the invention effectively reduces the probability of unlocking the electronic device due to unintentional touch.

It will be apparent to those skilled in the art that various modifications and variations can be made to the disclosed exemplary embodiments without departing from the scope or spirit of the invention. In view of the foregoing, it is intended that the invention covers modifications and variations provided that they fall within the scope of the following claims and their equivalents.

What is claimed is:

1. An unlocking method, adapted for an electronic device comprising a touch screen and being in a screen lock mode, the unlocking method comprising:
    displaying a first region and a second region on the touch screen;
    adjusting a layout of at least one of the first region and the second region according to a tilting state of the electronic device;
    receiving a touch operation performed on the touch screen; and
    switching the electronic device to an unlock mode when the touch operation starts in the first region and ends in the second region based on the adjusted layout.

2. The unlocking method according to claim 1, wherein the step of adjusting the layout of the at least one of the first region and the second region according to the tilting state of the electronic device comprises:
    obtaining a tilting angle of the electronic device according to a sensing result of a G-sensor of the electronic device; and
    adjusting the layout of the at least one of the first region and the second region according to the tilting angle.

3. The unlocking method according to claim 1, wherein the first region and the second region are divided by a dividing line, and the step of adjusting the layout of the at least one of the first region and the second region according to the tilting state of the electronic device comprises:

maintaining the dividing line to be parallel to a horizontal plane.

4. The unlocking method according to claim 1, wherein the first region and the second region are divided by a dividing line, and the step of adjusting the layout of the at least one of the first region and the second region according to the tilting state of the electronic device comprises:

rendering an angle between the dividing line and a side of a display image of the touch screen smaller than 90 degrees.

5. The unlocking method according to claim 1, wherein the first region has a first area before the layout of the at least one of the first region and the second region is adjusted, the first region has a second area after the layout of the at least one of the first region and the second region is adjusted, and the first area and the second area are substantially the same.

6. The unlocking method according to claim 1, wherein the first region and the second region are divided by a dividing line, the dividing line comprises a first end point and a second end point, the first end point is connected to a first side of a display image of the touch screen, and the second end point is connected to a second side of the display image of the touch screen.

7. The unlocking method according to claim 1, further comprising:

displaying an operable object in the first region,
wherein the step of switching the electronic device to the unlock mode when the touch operation starts in the first region and ends in the second region comprises:
determining whether the touch operation corresponds to a drag operation of the operable object;
determining whether the touch operation starts in the first region and ends in the second region when the touch operation corresponds to the drag operation of the operable object; and
switching the electronic device to the unlock mode when the touch operation starts in the first region and ends in the second region.

8. The unlocking method according to claim 7, wherein the step of switching the electronic device to the unlock mode comprises:

displaying an application program interface corresponding to the operable object on the touch screen.

9. The unlocking method according to claim 7, wherein the first region and the second region are divided by a dividing line, a first distance exists between the operable object and the dividing line before the layout of the at least one of the first region and the second region is adjusted, and a second distance exists between the operable object and the dividing line after the layout of the at least one of the first region and the second region is adjusted, wherein the first distance and the second distance are substantially the same.

10. The unlocking method according to claim 7, wherein the first region and the second region are divided by a dividing line, a first distance exists between the operable object and the dividing line, and the step of adjusting the layout of the at least one of the first region and the second region according to the tilting state of the electronic device comprises:

adjusting a length of the dividing line, wherein the first distance is in a negative correlation with the length of the dividing line.

11. An unlocking method, adapted for an electronic device comprising a touch screen and being in a screen lock mode, the unlocking method comprising:

displaying a first region and a second region on the touch screen;
adjusting a layout of the at least one of the first region and the second region according to using state information of the electronic device or external environment information;
receiving a touch operation performed on the touch screen; and
switching the electronic device to an unlock mode when the touch operation starts in the first region and ends in the second region based on the adjusted layout.

12. An electronic device, comprising:

a touch screen configured to receive a touch operation performed on the touch screen;
a G-sensor configured to sense a tilting state of the electronic device; and
a processor coupled to the touch screen and the G-sensor, wherein
when the electronic device is in a screen lock mode, the processor is configured to display a first region and a second region on the touch screen and adjust a layout of the at least one of the first region and the second region according to the tilting state of the electronic device, and
when the touch operation starts in the first region and ends in the second region, the processor switches the electronic device to an unlock mode based on the adjusted layout.

13. The electronic device according to claim 12, wherein the operation that the processor adjusts the layout of the at least one of the first region and the second region according to the tilting state of the electronic device comprises:

obtaining a tilting angle of the electronic device according to a sensing result of the G-sensor; and
adjusting the layout of the at least one of the first region and the second region according to the tilting angle.

14. The electronic device according to claim 12, wherein the first region and the second region are divided by a dividing line, and the operation that the processor adjusts the layout of the at least one of the first region and the second region according to the tilting state of the electronic device comprises:

maintaining the dividing line to be parallel to a horizontal plane.

15. The electronic device according to claim 12, wherein the first region and the second region are divided by a dividing line, and the operation that the processor adjusts the layout of the at least one of the first region and the second region according to the tilting state of the electronic device comprises:

rendering an angle between the dividing line and a side of a display image of the touch screen smaller than 90 degrees.

16. The electronic device according to claim 12, wherein the first region has a first area before the layout of the at least one of the first region and the second region is adjusted, the first region has a second area after the layout of the at least one of the first region and the second region is adjusted, and the first area and the second area are substantially the same.

17. The electronic device according to claim 12, wherein the first region and the second region are divided by a dividing line, the dividing line comprises a first end point and a second end point, the first end point is connected to a first side of a display image of the touch screen, and the second end point is connected to a second side of the display image of the touch screen.

18. The electronic device according to claim 12, wherein the processor is further configured to display an operable object in the first region, and the operation that the processor switches the electronic device to the unlock mode when the touch operation starts in the first region and ends in the second region comprises:
  determining whether the touch operation corresponds to a drag operation of the operable object;
  determining whether the touch operation starts in the first region and ends in the second region when the touch operation corresponds to the drag operation of the operable object; and
  switching the electronic device to the unlock mode when the touch operation starts in the first region and ends in the second region.

19. The electronic device according to claim 18, wherein the operation that the processor switches the electronic device to the unlock mode comprises:
  displaying an application program interface corresponding to the operable object on the touch screen.

20. The electronic device according to claim 18, wherein the first region and the second region are divided by a dividing line, a first distance exists between the operable object and the dividing line before the layout of the at least one of the first region and the second region is adjusted, and a second distance exists between the operable object and the dividing line after the layout of the at least one of the first region and the second region is adjusted, wherein the first distance and the second distance are substantially the same.

21. The electronic device according to claim 18, wherein the first region and the second region are divided by a dividing line, a first distance exists between the operable object and the dividing line, and the operation that the processor adjusts the layout of the at least one of the first region and the second region according to the tilting state of the electronic device comprises:
  adjusting a length of the dividing line, wherein the first distance is in a negative correlation with the length of the dividing line.

22. An electronic device, comprising:
  a touch screen configured to receive a touch operation performed on the touch screen;
  an external environment sensor configured to sense an external environment information; and
  a processor coupled to the touch screen and the external environment sensor,
  wherein when the electronic device is in a screen lock mode, the processor is configured to display a first region and a second region on the touch screen and adjust a layout of the at least one of the first region and the second region according to using state information of the electronic device or the external environment information, and
  when the touch operation starts in the first region and ends in the second region, the processor switches the electronic device to an unlock mode based on the adjusted layout.

* * * * *